(12) United States Patent
Murakami

(10) Patent No.: US 7,630,169 B2
(45) Date of Patent: Dec. 8, 2009

(54) MOISTURE ABSORBING MECHANISM AND MAGNETIC DISK DRIVE

(75) Inventor: Kazuhisa Murakami, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 460 days.

(21) Appl. No.: 11/223,461

(22) Filed: Sep. 9, 2005

(65) Prior Publication Data

US 2006/0056106 A1    Mar. 16, 2006

(30) Foreign Application Priority Data

Sep. 10, 2004    (JP) .............................. 2004-263376

(51) Int. Cl.
*G11B 33/14* (2006.01)

(52) U.S. Cl. .................................. 360/97.02
(58) Field of Classification Search .............. 360/97.02; 720/648
See application file for complete search history.

(56) References Cited

U.S. PATENT DOCUMENTS

| | | | | |
|---|---|---|---|---|
| 4,812,938 A * | 3/1989 | Rogers et al. | ............... | 360/133 |
| 5,417,743 A * | 5/1995 | Dauber | ........................... | 96/13 |
| 5,734,521 A * | 3/1998 | Fukudome et al. | ....... | 360/97.03 |
| 6,683,746 B1 * | 1/2004 | Kuroki et al. | ............. | 360/97.02 |
| 2003/0056653 A1 * | 3/2003 | Ueki et al. | ..................... | 96/134 |

FOREIGN PATENT DOCUMENTS

| | | | |
|---|---|---|---|
| JP | 06-325564 | | 11/1994 |
| JP | 08-045263 | A | 2/1996 |
| JP | 11-323739 | | 11/1999 |
| JP | 11-323739 | A * | 11/1999 |
| JP | 2002-109855 | A | 4/2002 |
| JP | 2003-340233 | A | 12/2003 |

* cited by examiner

*Primary Examiner*—Julie Anne Watko
(74) *Attorney, Agent, or Firm*—Townsend and Townsend and Crew LLP; John Henkhaus

(57) ABSTRACT

Embodiments of the invention provide a moisture absorbing mechanism for condensing excessive moisture in an environment primarily thereon so that the condensed moisture is absorbed by an absorbent material. In one embodiment, the moisture absorbing mechanism includes a dew condensation trapping mechanism (moisture collector) provided on a surface of an absorbent material such as silica gel or activated carbon in such a fashion that the absorbent material is covered with the dew condensation trapping mechanism. The moisture collector has a structure obtained by stacking a plurality of mesh sheets; a structure formed from a porous material having good air permeability, such as a sponge; a structure obtained by aligning fibers in the form of a brush; or the like. Three-dimensional narrow spaces are formed in each of the moisture collectors, and excessive moisture in the environment is condensed primarily inside each of the narrow spaces because a vapor pressure inside the narrow space is relatively low. The moisture absorbing mechanism is attached to a base inside a magnetic disk drive or the like with an adhesive.

9 Claims, 2 Drawing Sheets

MOISTURE ABSORBING MECHANISM AND MAGNETIC DISK DRIVE

CROSS-REFERENCES TO RELATED APPLICATIONS

This application claims priority from Japanese Patent Application No. JP2004-263376, filed Sep. 10, 2004, the entire disclosure of which is incorporated herein by reference.

BACKGROUND OF THE INVENTION

The present invention relates to a moisture absorbing mechanism and a magnetic disk drive having the moisture absorbing mechanism.

There are two major technical tasks to be accomplished in the development of magnetic disk drives. One is achievement of a higher data transmission rate, and the other is achievement of a larger recording capacity of the magnetic disk drive. In order to achieve the larger recording capacity, a recording density of recording data on a magnetic disk is increased by reducing a flying height of a magnetic head. With the reduction in flying height of the magnetic head, a distance between the magnetic head and the magnetic disk is reduced, and a flying stability of the magnetic head becomes subject to disturbance. Also, if dew condensation occurs on the magnetic head, the flying of the magnetic head becomes unstable to cause contact of the magnetic head with the magnetic disk, thereby damaging the magnetic head and the magnetic disk as well as degrading their reliability. In the case of resulting in a crush, information on the magnetic disk can be lost. Further, the magnetic head and the magnetic disk can be corroded due to the occurrence of dew condensation, thereby degrading the reliability.

Conventionally, the dew condensation has been prevented by suppressing an increase in humidity with the use of a desiccant such as silica gel or activated carbon. Such prevention has been satisfactory for magnetic disk drives used indoor.

Demand for the magnetic disk drive is being increased since the magnetic disk drive is incorporated not only into personal computers (PCs) equipped in offices but also outdoors as being incorporated into notebook type PCs and car navigation systems mounted on vehicles. As a result, the use environment of the magnetic disk drive is becoming more severe. In the case where transport of the magnetic disk drives is facilitated, other problems occur, such as an increase in vibration applied on the magnetic disk drives, temperature changes due to environmental changes and humidity changes caused by the temperature changes, and continuous operation under severe environment.

A sharp temperature change in external environment of the magnetic disk drive greatly influences the internal environment of the magnetic disk drive. For instance, when the magnetic disk drive is carried from outdoor to an air-conditioned cool room in summer, the sharp decrease in temperature of the external environment causes a magnetic disk drive internal temperature to decrease sharply. As a result, humidity inside the magnetic disk drive is increased to cause the dew condensation. Since the sharp temperature change hardly occurs under the conventional use environment such as in offices and the like, an increase in humidity caused by a temperature decrease inside the magnetic disk drive under the conventional use environment has been satisfactorily suppressed by the desiccant such as silica gel without a problem. However, the conventional desiccants such as silica gel cannot cope with the sharp increase in humidity; nor can it prevent the dew condensation.

Accordingly, as countermeasures for the dew condensation due to the sharp increase in humidity, the following proposals have been made. Patent Literature 1 (JP-A-8-45263) discloses a technique of disposing metal fibers having a high thermal conductivity in a magnetic disk container as a moisture absorbing structure. With this technique, in the case where an ambient temperature decreases sharply, the temperature of the high thermal conductivity metal fibers is decreased, so that vapor adheres on the surfaces of the metal fibers in the same manner as dew condensation, whereby the metal fibers absorb the vapor inside the container. Patent Literature 2 (JP-A-2002-109855) discloses a technique where a humidity conditioning plate made from a porous material is attached to an inner wall of a housing to cause dew condensation forcibly on the porous humidity conditioning plate, thereby preventing the dew condensation on other components. This technique takes advantage of the fact that the external temperature is lower than the internal temperature. With the technique, a temperature of the humidity conditioning plate is decreased by the external temperature to cause dew condensation on the humidity conditioning plate having the lowest temperature in the internal environment prior to other components, thereby preventing dew condensation on the other components. Patent Literature 3 (JP-A-2003-340233) discloses a technique wherein the capillarity of a porous material is utilized for causing dew condensation, which occurs when a humidity is increased sharply, primarily on the porous material, thereby preventing dew condensation on the other components.

BRIEF SUMMARY OF THE INVENTION

The technique disclosed in Patent Literature 1 is insufficient to prevent the dew condensation on other components in a highly humid environment since the dew condensation remains as it is on the metal fibers. The technique disclosed in Patent Literature 2 requires a certain temperature difference between the humidity conditioning plate and the components in the internal environment; however, when the magnetic disk drive is incorporated into another device, it is possible that the external temperature is almost constant, thus making it difficult to cause the internal temperature difference. With the technique disclosed in Patent Literature 3, a time loss with respect to moisture passing through an armored film occurs since the porous material is disposed inside a moisture absorbing unit. In the case where a humidity increase rate is too high inside the magnetic disk drive, the dew condensation can occur on a component other than the moisture absorbing unit.

A feature of this invention is to provide a moisture absorbing mechanism for condensing excessive moisture in an environment primarily thereon so that the condensed moisture is absorbed by an absorbent material.

Another feature of this invention is to provide a magnetic disk drive provided with the moisture absorbing mechanism preventing dew condensation from occurring on a magnetic head.

In accordance with one aspect of the present invention, a moisture absorbing mechanism includes an absorbent material and a moisture collector covering the absorbent material.

In some embodiments, the moisture collector is formed by arranging fibers in the form of a brush on the absorbent material. The moisture collector may be a stack of a plurality of mesh sheets. The moisture collector may be made of a porous material. The porous material may be a sponge.

In accordance with another aspect of the present invention, a magnetic disk drive includes a magnetic disk, a magnetic head for reading and writing data from and to the magnetic disk, a positioning mechanism for positioning the magnetic head at an arbitrary position in a radial direction of the magnetic disk, and a moisture absorbing mechanism having an absorbent material and a moisture collector covering the absorbent material.

In specific embodiments, the moisture collector may be formed by aligning fibers in the form of a brush on the moisture absorbing mechanism. The moisture collector may be a stack of a plurality of mesh sheets. The moisture collector may be made of a porous material. The porous material may be a sponge.

According to this invention, it is possible to provide a moisture absorbing mechanism for condensing excessive moisture in an environment primarily thereon so that the condensed moisture is absorbed by an absorbent material.

Also, according to this invention, it is possible to provide a magnetic disk drive which is capable of preventing dew condensation on a magnetic head and has high reliability.

DETAILED DESCRIPTION OF THE INVENTION

Figure 1:
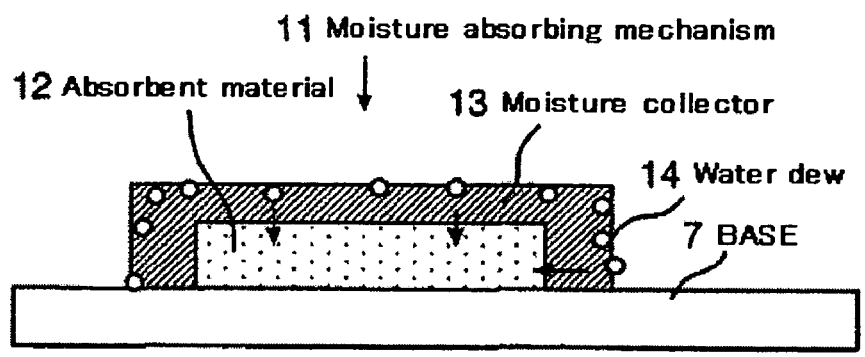
FIG. 1 is a sectional view showing a schematic constitution of a moisture absorbing mechanism according to one embodiment of this invention.

FIG. 1 is a cross-sectional view showing a schematic constitution of a moisture absorbing mechanism 11 according to one embodiment of this invention. The moisture absorbing mechanism 11 includes a dew condensation trapping mechanism (moisture collector) 13 provided on a surface of an absorbent material 12 such as silica gel or activated carbon in such a fashion that the absorbent material 12 is covered with the dew condensation trapping mechanism 13. The moisture absorbing mechanism 11 is attached to a base 7 inside a magnetic disk drive or the like with an adhesive or the like and used for rapidly reducing a humidity increased inside the magnetic disk drive and reliably retaining the collected moisture.

Figure 4:
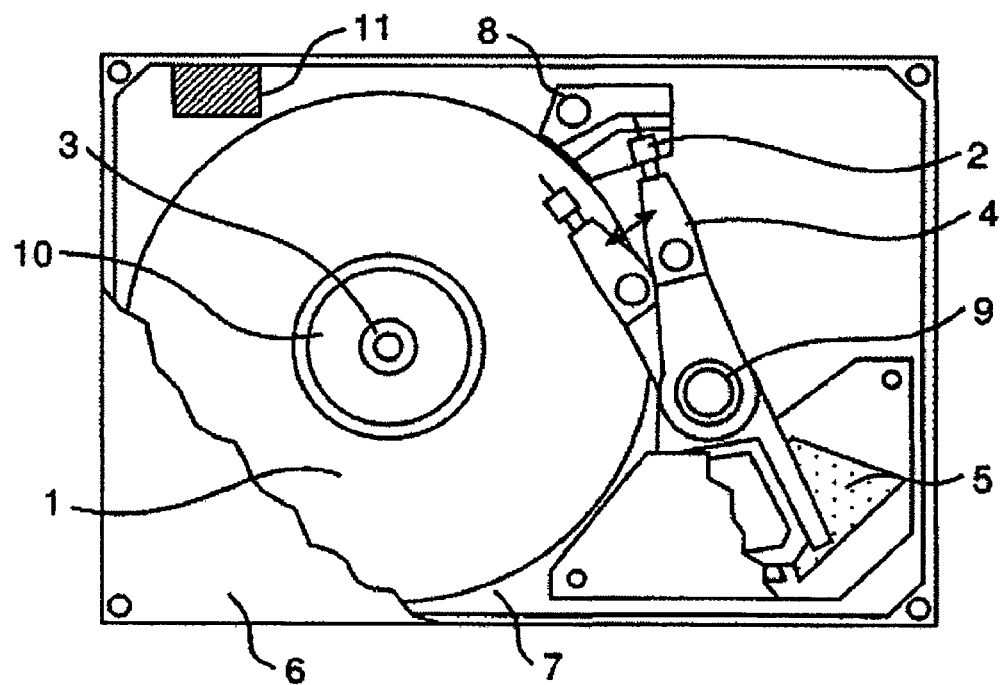
FIG. 4 is a schematic diagram showing a magnetic disk drive provided with the moisture absorbing mechanism according to the embodiment of this invention.

Shown in FIG. 4 is a schematic diagram of a magnetic disk drive to which the moisture absorbing mechanism 11 according to the embodiment of this invention is attached. The magnetic disk drive has such a structure that a spindle motor 3, a pivot bearing 9, and a voice coil motor (VCM) 5 are disposed in a container formed of the base 7 and a cover 6. A magnetic disk 1 is mounted on the spindle motor 3 and fixed by a disk clamp 10. A head arm 4 and a coil of the VCM 5 are attached to the pivot bearing 9. With supply of a current to the coil of the VCM 5, the head arm 4 turns about the pivot bearing 9 to position the magnetic head 2 attached to a tip of the head arm 4 at a radial position on the magnetic disk 1, whereby the data writing/reading operations are performed.

The VCM 5, the pivot bearing 9, and the head arm 4 constitute a head positioning mechanism. When the writing/reading operations are not performed, the magnetic head 2 is unloaded to a ramp mechanism 8. The moisture absorbing mechanism 11 shown in FIG. 1 is attached to the base 7 with an adhesive or the like. When humidity inside the magnetic disk drive is increased, water dew starts to be condensed primarily on the moisture collector 13 inside the magnetic disk drive. Therefore, dew condensation on other components such as the magnetic head 2 and the magnetic disk 1 is prevented.

Figure 2:
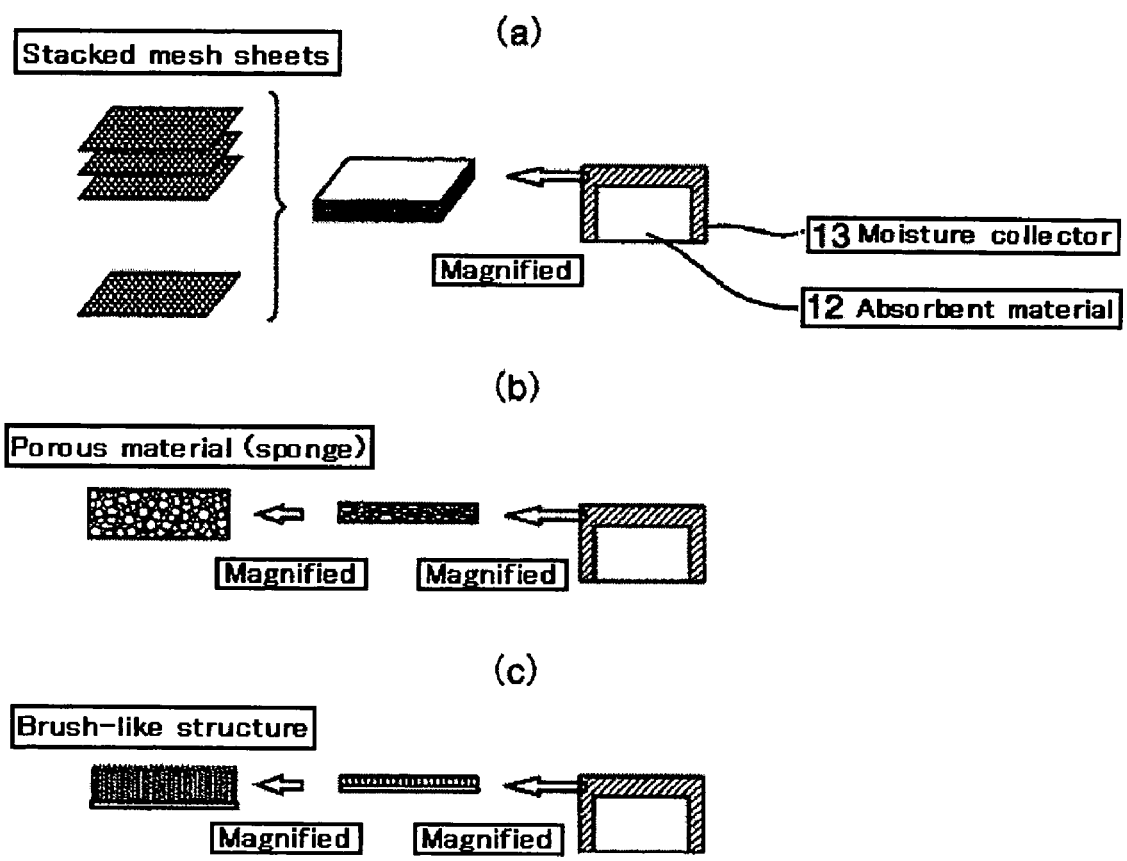
FIG. 2 is diagrams showing specific constitutions of the absorbent material according to the embodiment of this invention.

FIG. 2 illustrates specific constitutions of the moisture absorbing mechanism 11. In the constitution shown in FIG. 2A, a surface of the absorbent material 12 is covered with a moisture collector 13 which is formed by stacking a plurality of mesh sheets. Owing to the stack of mesh sheets, the moisture collector 13 has three-dimensional narrow spaces. In the constitution shown in FIG. 2B, the surface of the absorbent material 12 is covered with a moisture collector 13 formed from a porous material having a good air permeability, such as a sponge. The porous material is a material having a multiple of small grooves or a material obtainable by weaving fibers in three dimensions, and three-dimensional narrow spaces are formed by the small grooves or the fibers. In the constitution shown in FIG. 2C, the surface of the absorbent material 12 is covered with a moisture collector 13 formed by aligning fibers in one direction in the form of a brush. A space between the adjacent fibers is a three-dimensional narrow space.

Figure 3:
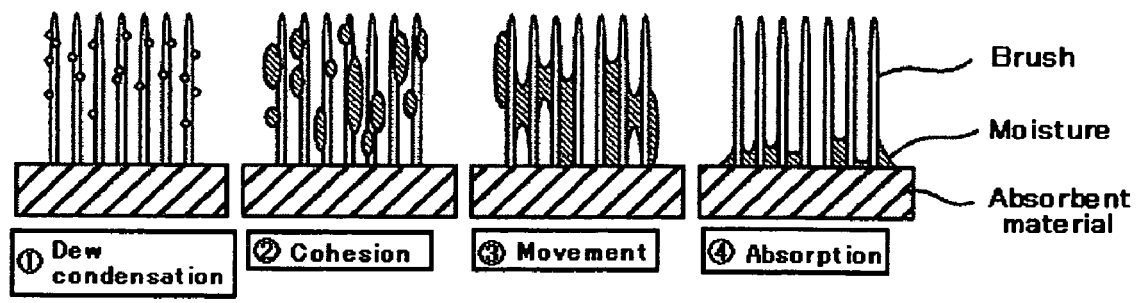
FIG. 3 is an illustration of a function of the moisture absorbing mechanism according to the embodiment of this invention.

Hereinafter, a function of the moisture absorbing mechanism 11 will be described with reference to FIG. 3. Shown in FIG. 3 is an example wherein the brush-like moisture collector 13 is used. In the case where the moisture absorbing mechanism 11 is provided inside a magnetic disk drive or the like, a vapor pressure in the narrow space between the adjacent fibers of the brush becomes lower than that of the outside of the moisture collector 13. In the internal environment of the magnetic disk drive, the vapor pressure inside the moisture collector 13 becomes the lowest. Accordingly, when humidity inside the magnetic disk drive is increased, dew condensation occurs first on one of the fibers of the brush inside the magnetic disk drive. As the dew condensation proceeds, the small adjacent pieces of water dew come into contact with each other and cohere to form a larger piece of water dew. The large piece of water dew contacts a plurality of the fibers to cause the capillarity, so that water dew starts to move. When the water dew reaches the absorbent material 12, the moisture is absorbed by the absorbent material 12. Then, a narrow space is formed between the adjacent fibers again to continue the moisture collection. Therefore, dew condensation on components other than the moisture absorbing mechanism 11, such as the magnetic head and the magnetic disk, is prevented.

The moisture collector 13 should be free from a pressure loss. If the pressure loss occurs, there is caused a time loss with respect to highly humid air that enters the moisture collector 13, thereby causing the dew condensation on the components other than the moisture collector 13. To overcome this disadvantage, the moisture collector 13 is disposed on an outer surface of the absorbent material 12 so as to come in direct contact with a space inside the magnetic disk drive, thereby coping with a sharp change in humidity.

Although the absorbent material 12 and the moisture collector 13 are in contact with each other in the foregoing embodiment, this configuration is not indispensable. That is to say, a gap may be provided between the absorbent material 12 and the moisture collector 13. The moisture collector 13 may preferably have a Gurley number of 15 seconds or less (the Gurley number is the time required for 100 cm³ of air to pass through a filter medium of 6.45 cm² with a pressure difference of 1216 Pa (12.4 cm H₂0)). As the moisture collector 13, materials other than those having the narrow space structure, such as a polymer material which readily absorbs moisture, can be used.

As described above, according to the embodiment of this invention, the dew condensation is allowed to primarily occur on the moisture collector so as to rapidly absorb the collected moisture by the absorbent material. This makes it possible to prevent the occurrence of dew condensation on the components other than the moisture collector, such as the magnetic head and the magnetic disk, in the case where the magnetic disk drive is carried from a high temperature environment to a low temperature environment, for example, and a relative humidity in the internal environment is sharply increased. Thus, it is possible to avoid contact or crush between the magnetic head and the magnetic disk, which is caused by a deposition of moisture on the magnetic head or the magnetic disk. Also, it is possible to avoid troubles such as corrosion, electrical short, and contamination which are caused by the deposition of moisture on the magnetic head, the magnetic disk, and the other components, thereby making it possible to improve reliability of the magnetic disk drive.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A magnetic disk drive comprising: a magnetic disk; a magnetic head for reading and writing data from and to the magnetic disk; a positioning mechanism configured to position the magnetic head at an arbitrary position in a radial direction of the magnetic disk; and a moisture absorbing mechanism having an absorbent material and a moisture collector covering the absorbent material, the moisture collector functioning to condense gas phase humidity within the disk drive into liquid phase water that is in contact with the moisture collector, wherein the moisture collector of the moisture absorbing mechanism is formed of fibers aligned substantially perpendicular to the absorbent material and in the form a brush on the absorbent material, and wherein the liquid phase water in contact with the fiber moves by capillary action to the absorbent material for absorption.

2. The magnetic disk drive according to claim 1, further comprising a base and a cover forming an enclosure in which the magnetic disk, the magnetic head, the positioning mechanism, and the moisture absorbing mechanism are disposed.

3. The magnetic disk drive according to claim 2, wherein the absorbent material is disposed on the base, and wherein the moisture collector is attached to the base and covers the absorbent material.

4. An enclosure including therein a moisture absorbing mechanism, the moisture absorbing mechanism comprising: an absorbent material; and a moisture collector covering the absorbent material, wherein the moisture collector comprises a plurality of fibers and a plurality of three-dimensional spaces between the fibers, wherein a vapor pressure in the plurality of three-dimensional spaces is lower than a vapor pressure inside the enclosure external of the moisture collector such that the moisture collector functions to condense gas phase humidity within the disk drive into liquid phase water that is in contact with the plurality of fibers, and wherein the fibers of the moisture collector are aligned in a direction substantially perpendicular to a surface of the absorbent material, and wherein the liquid phase water in contact with the plurality of fibers moves by capillary action to the absorbent material for absorption.

5. The enclosure according to claim 4, wherein the absorbent material comprises silica gel or activated carbon.

6. The enclosure according to claim 4, wherein the enclosure comprises a base and a cover, wherein the absorbent material is disposed on the base, and wherein the moisture collector is attached to the base and covers the absorbent material.

7. The enclosure according to claim 4, further comprising:
   a magnetic disk disposed inside the enclosure;
   a magnetic head for reading and writing data from and to the magnetic disk and being disposed inside the enclosure; and
   a positioning mechanism configured to position the magnetic head at an arbitrary position in a radial direction of the magnetic disk and being disposed inside the enclosure.

8. A magnetic disk drive comprising: a magnetic disk; a magnetic head for reading and writing data from and to the magnetic disk; a positioning mechanism configured to position the magnetic head at an arbitrary position in a radial direction of the magnetic disk; an enclosure containing the magnetic disk, the magnetic head, and the positioning mechanism and having at least a first wall that separates an interior of the enclosure from an external environment; and a moisture absorbing mechanism having an absorbent material and a moisture collector covering the absorbent material, such that the moisture collector functions to condense gas phase humidity within the disk drive into liquid phase water that is in contact with the moisture collector, and wherein the moisture absorbing mechanism is attached to the first wall at a region that does not have an opening from the interior of the enclosure to the exterior environment, wherein the moisture collector is formed of fibers aligned in the form of a brush on the absorbent material, and wherein the liquid phase water in contact with the fibers moves by capillary action to the absorbent material for absorption.

9. The magnetic disk drive according to claim 8, wherein an entire first surface of the moisture absorbing mechanism is attached directly to the first wall.

\* \* \* \* \*